US008525813B1

(12) United States Patent
Smith et al.

(10) Patent No.: US 8,525,813 B1
(45) Date of Patent: Sep. 3, 2013

(54) MULTI-POINT INTERFACE FOR A GRAPHICAL MODELING ENVIRONMENT

(75) Inventors: Paul F. Smith, Milan, MI (US); Arvind S. Hosagrahara, Novi, MI (US)

(73) Assignee: The MathWorks, Inc., Natick, MA (US)

( * ) Notice: Subject to any disclaimer, the term of this patent is extended or adjusted under 35 U.S.C. 154(b) by 1523 days.

(21) Appl. No.: 11/889,270

(22) Filed: Aug. 10, 2007

Related U.S. Application Data

(63) Continuation of application No. 11/647,458, filed on Dec. 29, 2006.

(51) Int. Cl.
*G06F 3/042* (2006.01)

(52) U.S. Cl.
USPC ............. 345/175; 178/18.09; 700/17; 700/83

(58) Field of Classification Search
USPC ............. 178/18.01–18.11; 345/1.1, 2.1–2.3, 345/156–157, 173–178; 700/17, 83; 715/700–866
See application file for complete search history.

(56) References Cited

U.S. PATENT DOCUMENTS

| | | | |
|---|---|---|---|
| 5,025,314 A | 6/1991 | Tang et al. | |
| 5,483,261 A | 1/1996 | Yasutake | |
| 6,292,576 B1 * | 9/2001 | Brownlee | 382/124 |
| 7,071,914 B1 * | 7/2006 | Marks | 345/156 |
| 7,519,223 B2 | 4/2009 | Dehlin et al. | |
| 2006/0026536 A1 * | 2/2006 | Hotelling et al. | 715/863 |
| 2006/0210193 A1 | 9/2006 | Ishii | |
| 2006/0227120 A1 * | 10/2006 | Eikman | 345/175 |
| 2007/0132779 A1 * | 6/2007 | Gilbert et al. | 345/619 |
| 2008/0088593 A1 | 4/2008 | Smoot | |

OTHER PUBLICATIONS

U.S. Appl. No. 11/647,458, Smith et al.
Benko et al., "Precise Selection Techniques for Multi-Touch Screens," CHI 2006, Apr. 22-28, 2006, Montreal, Quebec, Canada.
Davidson et al., "Synthesis and Control on Large Scale Multi-Touch Sensing Displays," NIME 2006, Jun. 4-8, 2006, Paris, France, pp. 216-219.
Han, Jefferson Y., "Low-Cost Multi-Touch Sensing Through Frustrated Total Internal Reflection," ACM Symposium on User Interface Software and Technology, 115-118 (2005), <http://portal.acm.org/citation.cfm?id=1095054>.

* cited by examiner

*Primary Examiner* — Michael Pervan
(74) *Attorney, Agent, or Firm* — Venable LLP; Michael A. Sartori; Todd R. Fansworth

(57) ABSTRACT

A graphical model is displayed. A location of a portion of a user in relation to the displayed graphical model is sensed to obtain a sensed location of the portion of the user. A movement of the portion of the user in relation to the displayed graphical model and the sensed location of the portion of the user is sensed to obtain a sensed movement. The displayed graphical model is adjusted in response to the sensed movement of the portion of the user to obtain a displayed adjusted graphical model.

24 Claims, 23 Drawing Sheets

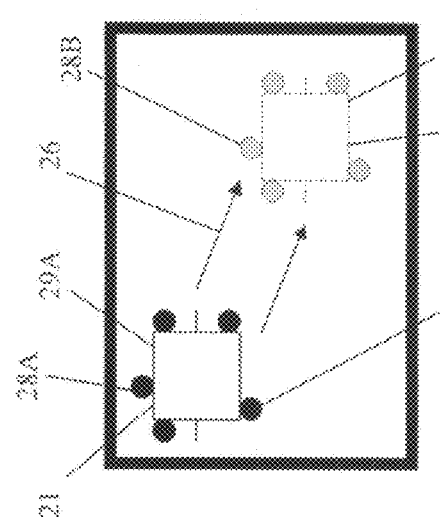
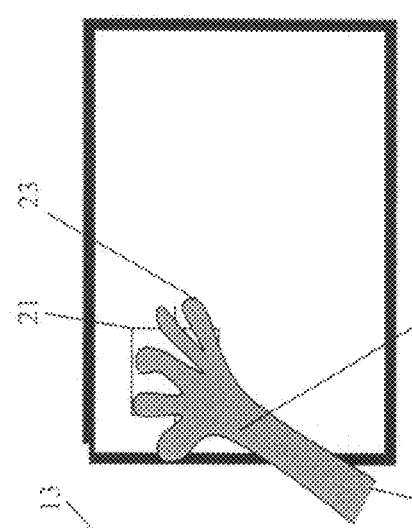
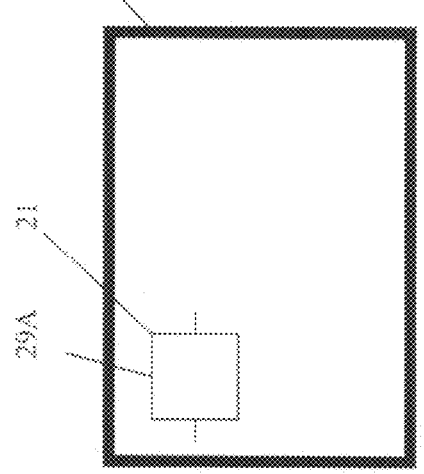
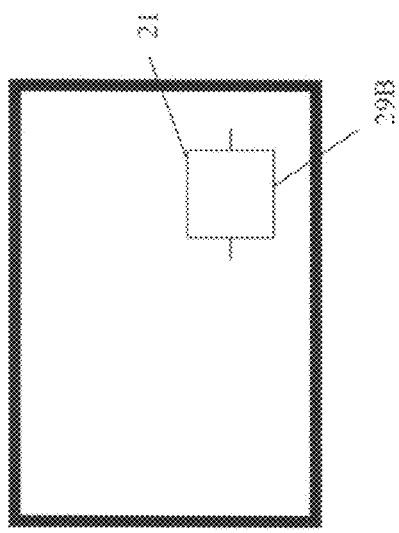
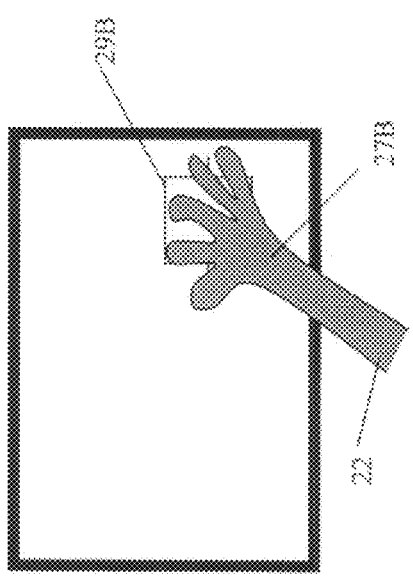

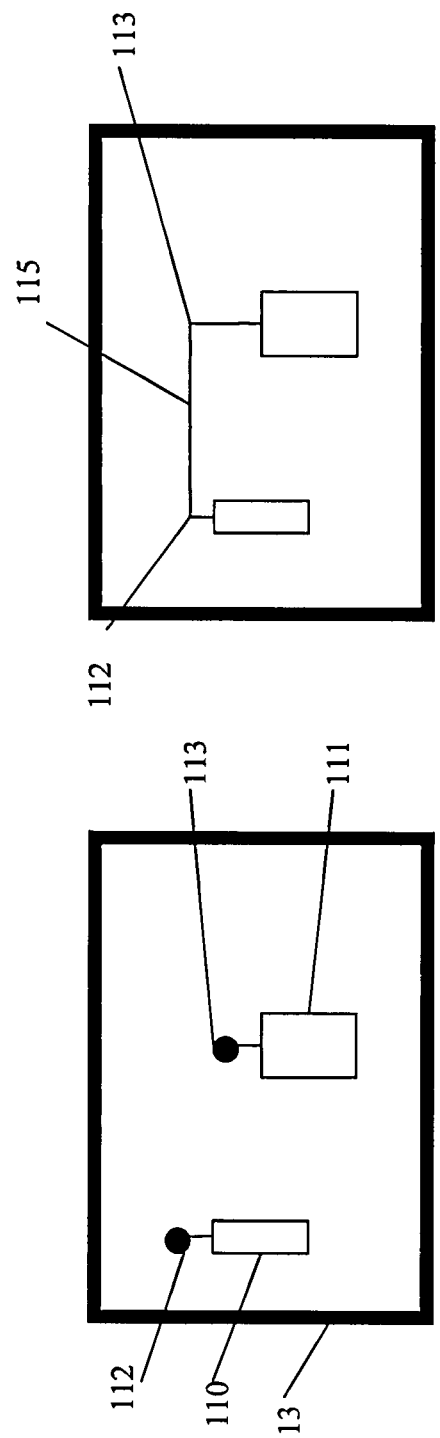

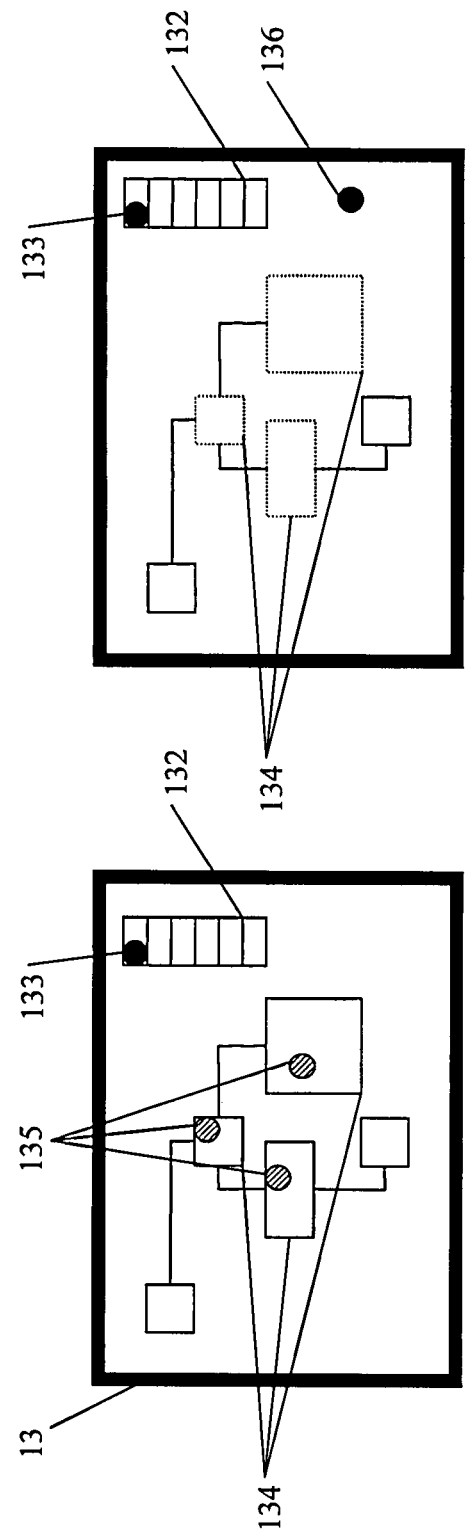

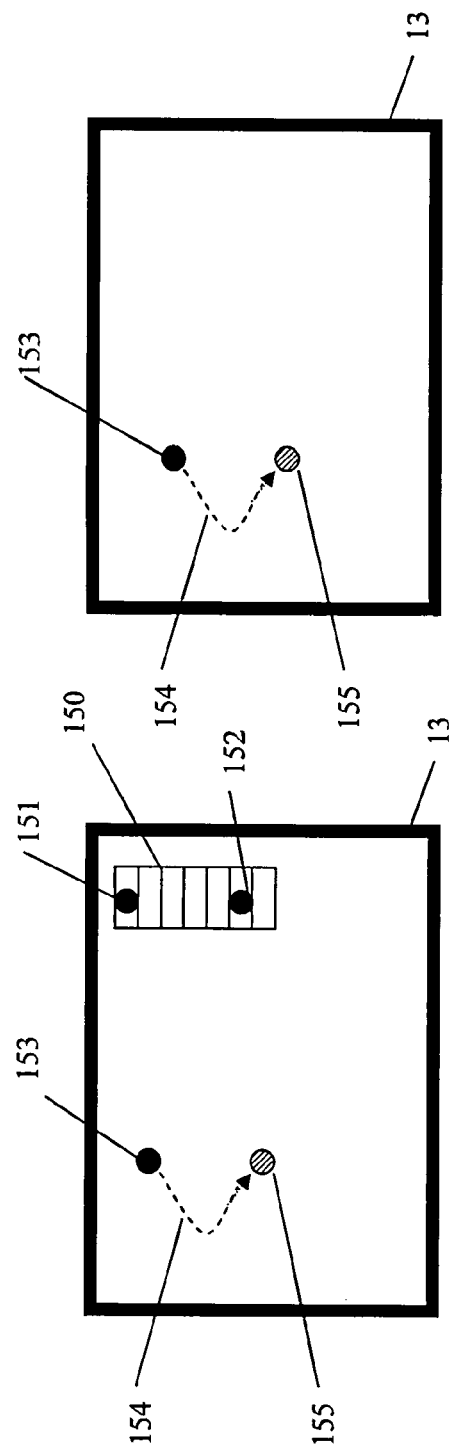
FIG. 15A
FIG. 15B
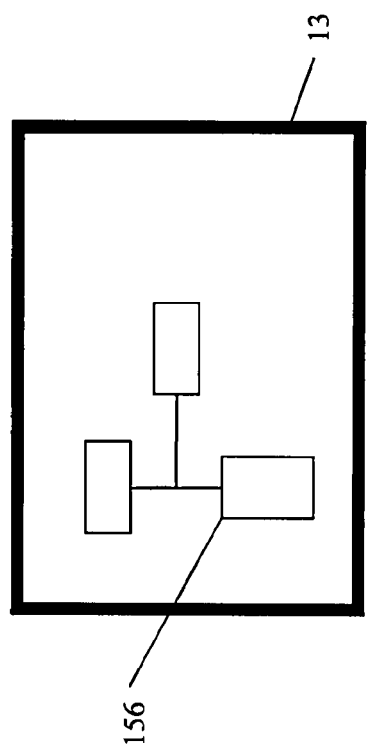
FIG. 15C

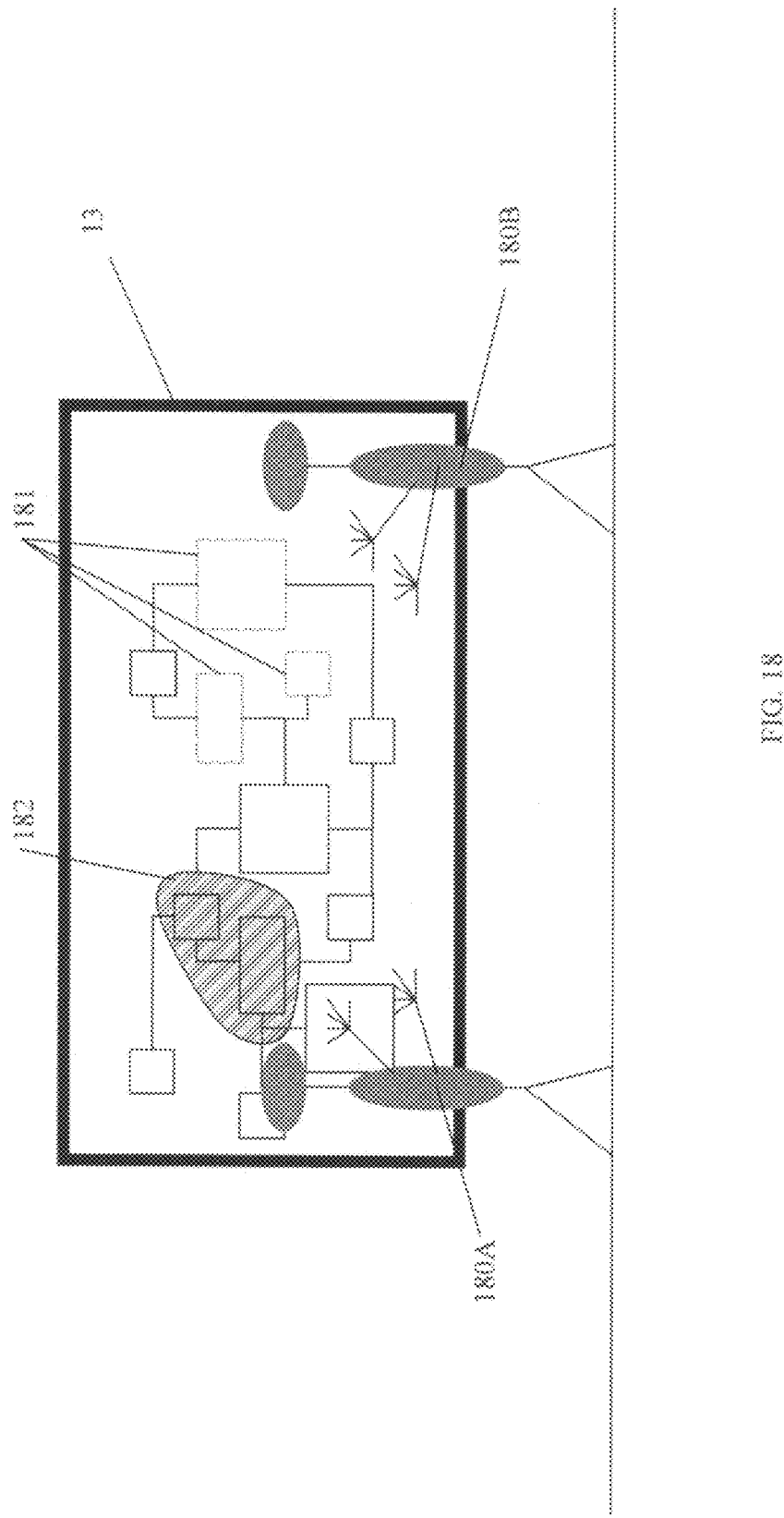

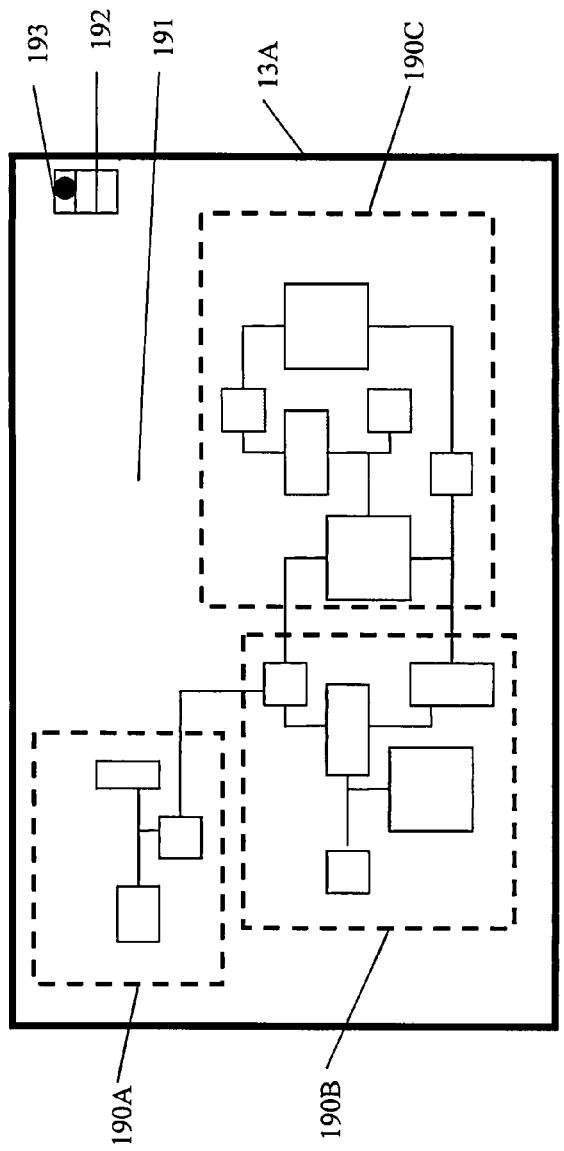
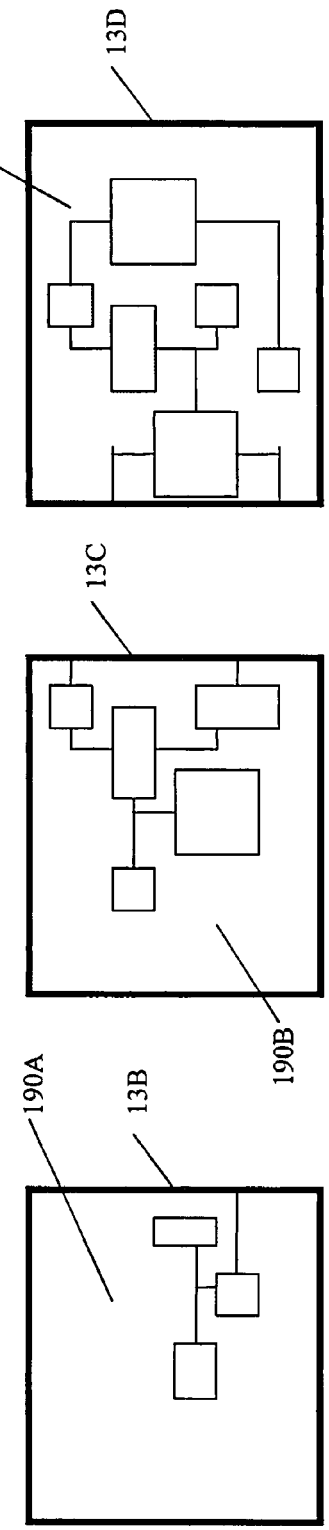
FIG. 19A
FIG. 19B

MULTI-POINT INTERFACE FOR A GRAPHICAL MODELING ENVIRONMENT

CROSS-REFERENCE TO RELATED PATENT APPLICATION

This application is a continuation of U.S. patent application Ser. No. 11/647,458 by Smith et al., filed Dec. 29, 2006, entitled "Multi-Point Interface for a Graphical Modeling Environment," the subject matter of which application is being incorporated herein by reference in its entirety.

BACKGROUND

Conventional input devices, such as, for example, a keyboard, a mouse, or a single-point touch screen, were designed for a computing world primarily oriented toward textual based input methods and having limited utility in a graphical computer programming environment. These conventional input devices have drawbacks. A keyboard can lead to repetitive stress injury. A mouse can only operate on a single point on the display and typically contains only two to three buttons of limited usability. A single-point touch screen can only register one point of contact at a time. These conventional input devices are not operated in an intuitive fashion and may require significant training before they can be effectively operated. For example, users of graphical models may find conventional input devices to be unintuitive and/or inadequate to allow the users to efficiently perform desired interactions with graphical models.

SUMMARY

In one embodiment, a method displays a graphical model. A location of a portion of a user in relation to the displayed graphical model is sensed to obtain a sensed location of the portion of the user. A movement of the portion of the user in relation to the displayed graphical model and the sensed location of the portion of the user is sensed to obtain a sensed movement. The displayed graphical model is adjusted in response to the sensed movement of the portion of the user to obtain a displayed adjusted graphical model.

In another embodiment a computer performs operations for displaying a graphical model. A graphical model is displayed. A location of a portion of a user in relation to the displayed graphical model is sensed to obtain a sensed location of the portion of the user. A movement of the portion of the user in relation to the displayed graphical model and the sensed location of the portion of the user is sensed to obtain a sensed movement. The displayed graphical model is adjusted in response to the sensed movement of the portion of the user to obtain a displayed adjusted graphical model.

In another embodiment, a system displays a graphical model. A graphical model is displayed. A location of a portion of a user in relation to the displayed graphical model is sensed to obtain a sensed location of the portion of the user. A movement of the portion of the user in relation to the displayed graphical model and the sensed location of the portion of the user is sensed to obtain a sensed movement. The displayed graphical model is adjusted in response to the sensed movement of the portion of the user to obtain a displayed adjusted graphical model.

In yet another embodiment, a system displays a graphical model. A graphical model is displayed. A location of a portion of a user in relation to the displayed graphical model is sensed to obtain a sensed location of the portion of the user. A movement of the portion of the user in relation to the displayed graphical model and the sensed location of the portion of the user is sensed to obtain a sensed movement. The displayed graphical model is adjusted in response to the sensed movement of the portion of the user to obtain a displayed adjusted graphical model.

BRIEF DESCRIPTION OF THE DRAWINGS

The foregoing and other features of the invention will be apparent from the following, more particular description of exemplary embodiments of the invention, as illustrated in the accompanying drawings wherein like reference numbers generally indicate identical, functionally similar, and/or structurally similar elements. The left most digits in the corresponding reference number indicate the drawing in which an element first appears.

FIGS. 2A-2E depict an exemplary multi-dimensional, multi-finger drag and drop operation.

FIGS. 11A and 11B depict an exemplary connect operation.

FIGS. 13A and 13B depict an exemplary multi-element selection operation.

FIGS. 15A-15C depict an exemplary record and assign operation.

FIG. 18 depicts an exemplary multi-user operation.

FIGS. 19A and 19B depict an exemplary distributed computing operation.

DEFINITIONS

Figure 1:
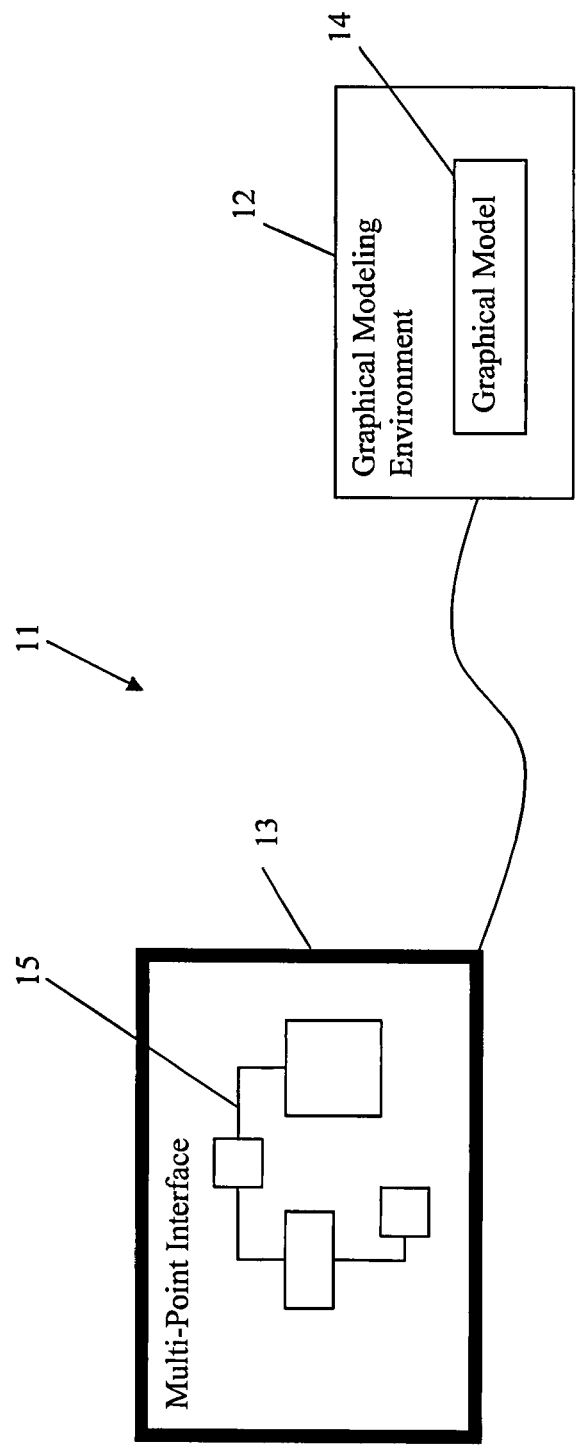
FIG. 1 depicts an exemplary embodiment of the computer-implemented graphical modeling system that utilizes a multi-point interface.

In describing the invention, the following definitions are applicable throughout (including above).

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, or a chip set; a system-on-chip (SoC) or a multiprocessor system-on-chip (MPSoC); a tablet personal computer (PC); an optical computer; and an apparatus that may accept data, may process data in accordance with one or more stored software programs, may generate results, and typically may include input, output, storage, arithmetic, logic, and control units.

"Software" may refer to prescribed rules to operate a computer. Examples of software may include: software; code segments; instructions; applets; pre-compiled code; compiled code; computer programs; and programmed logic.

A "computer-readable medium" may refer to any storage device used for storing data accessible by a computer. Examples of a computer-readable medium may include: a magnetic hard disk; a floppy disk; an optical disk, such as a CD-ROM and a DVD; a magnetic tape; a memory chip; and/or other types of media that can store machine-readable instructions thereon.

A "computer system" may refer to a system having one or more computers, where each computer may include a computer-readable medium embodying software to operate the computer. Examples of a computer system may include: a distributed computer system for processing information via computer systems linked by a network; two or more computer systems connected together via a network for transmitting and/or receiving information between the computer systems; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those that may be made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet. Exemplary networks may operate with any of a number of protocols, such as Internet protocol (IP), asynchronous transfer mode (ATM), and/or synchronous optical network (SONET), user datagram protocol (UDP), IEEE 802.x, etc.

DETAILED DESCRIPTION

Exemplary embodiments of the invention are discussed in detail below. While specific exemplary embodiments are discussed, it should be understood that this is done for illustration purposes only. In describing and illustrating the exemplary embodiments, specific terminology is employed for the sake of clarity. However, the invention is not intended to be limited to the specific terminology so selected. A person skilled in the relevant art will recognize that other components and configurations may be used without parting from the spirit and scope of the invention. It is to be understood that each specific element includes all technical equivalents that operate in a similar manner to accomplish a similar purpose. Each reference cited herein is incorporated by reference. The examples and embodiments described herein are non-limiting examples.

FIG. 1 depicts an exemplary embodiment of the computer-implemented graphical modeling system that utilizes a multi-point interface. The system may include a computer or a computer system 11. The computer system 11 may include a graphical modeling environment 12 and a multi-point interface 13. The graphical modeling environment 12 may include a graphical model 14. For illustrative purposes, other aspects of the computer system 11 are not shown. Examples of a graphical modeling environment may include: Simulink® by The MathWorks, Inc.; Stateflow® by The MathWorks; SimEvents™ by The MathWorks; SimMechanics by The MathWorks; LabViewe by National Instruments, Inc.; VisSim by Visual Solutions, Inc.; Dymola by Dynasim; SoftWIRE by Measurement Computing; WiT by DALSA Coreco; VEE Pro or SystemVue by Agilent; Gedae by Gedae, Inc.; Scicos from The French National Institute for Research in Computer Science and Control (INRIA); aspects of a Unified Modeling Language (UML) or SysML environment; among others. The graphical modeling environment 12 may be two-dimensional (i.e. having only one plane), three-dimensional (i.e. having multiple planes), etc.

The multi-point interface 13 may act as an interface between the user and the graphical modeling environment 12. The multi-point interface 13 may be able to display to a user the graphical model 14 in the graphical modeling environment 12 as a displayed graphical model 15. With the multi-point interface 13, an interaction of the user with the multi-point interface 13 results in a manipulation of the displayed graphical model 15. In its role as an interface, the multi-point interface 13 may be able to simultaneously recognize multiple points of input from the user within a specified region of interest in space relative to the multi-point interface 13. Input from the user, for example, may be physical contact and/or proximate contact with the input device. Physical contact may include touching or coming into physical contact with the multi-point interface 13. Proximate contact may include being in sufficient proximity to an input device such that a user input is sensed but the user is not in physical contact with the multi-point interface 13. This capability enables multi-hand and multi-finger (i.e., chorded) interaction with the graphical modeling system in which the multi-point interface 13 can simultaneously register multiple touches.

An example of the multi-point interface 13 illustrated in FIG. 1 may be implemented in accordance with frustrated total internal reflection ("FTIR") technology, which is described in Jefferson Y. Han, "Low-Cost Multi-Touch Sensing Through Frustrated Total Internal Reflection", Symposium on User Interface Software and Technology, 115-118 (2005). The multi-point interface 13 may also be implemented with layered electrocapacitive sensing technology, visible spectrum image recognition technology, etc.

FIGS. 2-15 illustrate several user interactions according to various exemplary embodiments of the invention. Such interactions may, for example, include: one finger on one hand of the user; one finger on one hand of the user and one finger on another hand of the user; multiple fingers on one hand of the user; one finger on one hand of the user and multiple fingers on another hand of the user; or multiple fingers on one hand of the user and multiple fingers on another hand of the user. The interaction can also include receiving simultaneous input from a first user and one or more other users and/or receiving simultaneous input from one or more parts of a user (e.g., one or more of the following or any combination thereof: finger, elbow, knee, other extremity, prosthetic device, etc.).

FIGS. 2A-2E depict an exemplary multi-dimensional, multi-finger drag and drop operation. In this embodiment of the invention, a user may drag and drop a displayed element, such as a displayed block 21, on the multi-point interface 13 from a first location 29A to a second location 29B. In FIG. 2A, the displayed block 21 is located on the multi-point interface 13 in the first location 29A.

In FIG. 2B, a hand 22 of the user, in a first position 27A, is placed over the displayed block 21. When the hand 22 of the user is placed over the displayed block 21, fingers 23 of the user contact the multi-point interface 13 around the edges of the displayed block 21. In FIG. 2C, portions of the fingers 23 of the user in contact with the multi-point interface 13 in a first location 28A are illustrated by dark circles. While the fingers 23 of the user stay in contact with the multi-point interface 13, the user may drag the displayed block 21 from the first location 29A by moving the hand 22 of the user across the multi-point interface 13, shown in FIG. 2C as a diagonal movement down and to the right. The arrows 26 in FIG. 2C refer to the movement of the user's hand 22 and the displayed block 21. As the user's hand 22 is moved, the portions of the fingers 23 may stay in contact with the multi-point interface 13 and the displayed block 21 appears to move across the multi-point interface. While the displayed block 21 is being moved, connections to other components in the graphical model may be adjusted accordingly. For example, block 21 may be located between a first block and a second block and connected to the first block by a first connection line and the second block via a second connection line. The first connection line and the second connection line may change length, angle with respect to block 21, etc., when block 21 is moved without becoming disconnected from the first block, second block, or block 21. The displayed block 21 in dotted line in FIG. 2C refers to the displayed block 21 in the second location 29B. The dotted and shaded second locations 28B in FIG. 2C refer to the location of the fingers 23 of the user at the second location 28B. In FIG. 2C, the hand 22 of the user is not shown so as to better illustrate the invention.

In FIG. 2D, the hand 22 of the user, in the second location 27B, is shown over top of the displayed block 21 in the second position 29B.

In FIG. 2E, the hand 22 and the fingers 23 of the user are removed from contact with the multi-point interface 13, and the displayed block 21 stays (i.e. is dropped) at the second location 29B. FIG. 2E shows the displayed block 21 in the second location 29B with the fingers 23 and the hand 22 of the user removed from contact with the multi-point interface 13.

The process depicted in FIGS. 2A-2E may be reversed to drag the displayed block 21 from the second location 29B and drop it back in the first position 29A. For example, the hand 22 of the user may be placed over the displayed block 21, at the second location 29B, such that the fingers 23 of the user contact the multi-point interface 13 around the edges of the displayed block 21. While the fingers 23 of the user stay in contact with the multi-point interface 13, the user may drag the displayed block 21 from the second location 29B by moving the hand 22 of the user across the multi-point interface 13. Once the displayed block 21 is at the first location 29A, the hand 22 and the fingers 23 of the user are removed from contact with the multi-point interface 13, and the displayed block 21 stays (i.e. is dropped) at the first location 29A.

Figure 3:
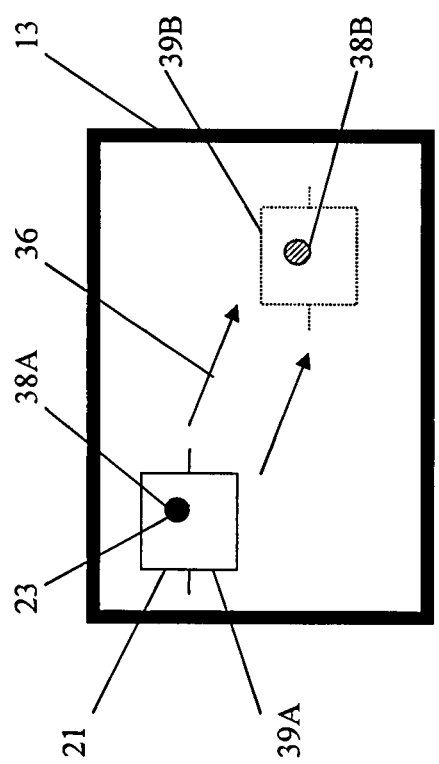
FIG. 3 depicts an exemplary multi-dimensional, single-finger drag and drop operation.

FIG. 3 depicts an exemplary multi-dimensional, single-finger drag and drop operation. The multi-dimensional operation may be in two, three or more dimensions. Higher dimensions may not be displayed simultaneously or may be displayed with other visual cues, such as, for example, color or texture. In this embodiment of the invention, a user may drag and drop a displayed element, such as a displayed block 21, on the multi-point interface 13 from a first location 39A to a second location 39B. The user may accomplish this by placing a portion of a finger 23 at a first location 38A inside the displayed block 21 on the multi-point interface 13. While the finger 23 stays in contact with the multi-point interface 13, the displayed block 21 may be dragged from the first location 39A by moving the finger 23 across the interface from the first location 38A to the second location 38B. The arrows 36 in FIG. 3 refer to the movement of the displayed block 21. By removing the finger 23 from the multi-point interface 13 at the second location 38B, the displayed block 21 may be dropped into the second location 39B.

The process depicted in FIG. 3 may be reversed to drag the displayed block 21 from the second location 29B and drop it back in the first position 29A. For example, the user may accomplish this by placing a portion of a finger 23 at the second location 38B inside the displayed block 21 on the multi-point interface 13. While the finger 23 stays in contact with the multi-point interface 13, the displayed block 21 may be dragged from the second location 39B by moving the finger 23 across the interface from the second location 38B to a second location 38A. By removing the finger 23 from the multi-point interface 13 at the first location 38A, the displayed block 21 may be dropped into the second location 39B.

In one alternative embodiment of the drag and drop operation depicted in FIG. 3, the user may move the displayed block 21 from one plane to a second plane in a three-dimensional graphical modeling environment. In another embodiment, the user may make a first interaction with the display to move the displayed block 21 in one plane (e.g., from side to side) and a second interaction with the display to move the displayed block 21 in another plane (e.g., forward and back).

Figure 4:
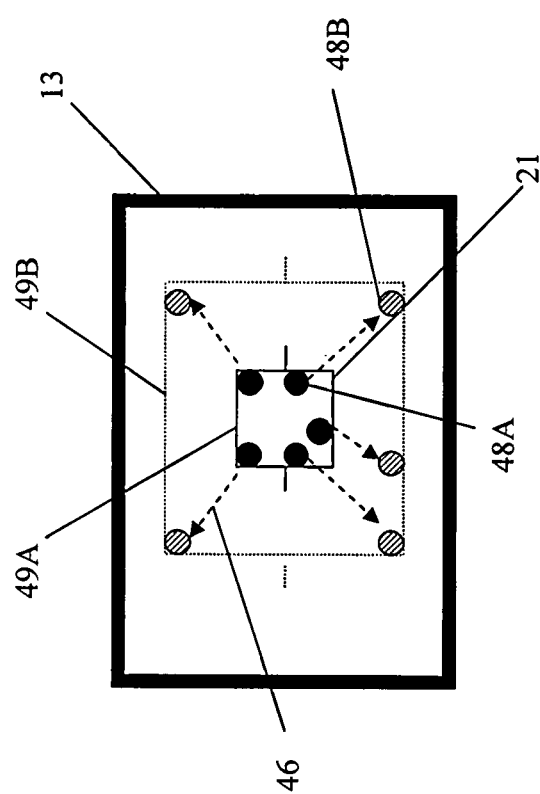
FIG. 4 depicts an exemplary multi-dimensional, multi-finger resizing operation.

FIG. 4 depicts an exemplary multi-dimensional, multi-finger resizing operation. In this embodiment of the invention, a user may resize a displayed element, such as a displayed block 21, on the multi-point interface 13 from a smaller size 49A to a larger size 49B. The user may accomplish this by placing fingers of the user at first locations 48A within the displayed block 21. The fingers of the user may be on the same hand or different hands. While staying in contact with the multi-point interface 13, the user may spread the fingers of the user outwardly to locations 48B. The dashed arrow lines 46 in FIG. 4 depict the movement of the fingers of the user across the multi-point interface 13. By removing the fingers of the user from the multi-point interface 13, the displayed block 21 is resized into the second, larger size 49B.

The process depicted in FIG. 4 may be reversed to downsize a displayed element. For example, the user may downsize a displayed item by bring the fingers together, such as moving the fingers from locations 48B to locations 48A.

In another embodiment of the resizing operation depicted in FIG. 4, the user may resize a displayed element, such as the displayed block 21 in FIG. 4, by pressing and holding one finger of the user in displayed block 21 and, with a second finger of the user, making a motion to downsize or enlarge the displayed block 21. A motion of the second finger which downsizes the displayed block 21 may be, for example: a converging spiral, a clockwise circle, or a vertical stroke upwards. A motion of the second finger which enlarges the display block 21 may be, for example: a diverging spiral, a counter-clockwise circle, or a vertical stroke downwards.

Figure 5:
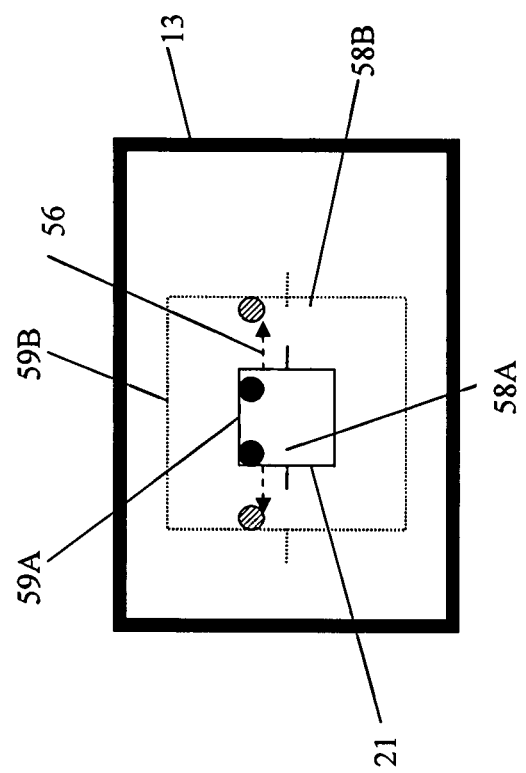
FIG. 5 depicts an exemplary multi-dimensional, two-finger resizing operation.

FIG. 5 depicts an exemplary multi-dimensional, two-finger resizing operation. In this embodiment of the invention, a user may resize a displayed element, such as a displayed block 21, on the multi-point interface 13 from a smaller size 59A to a larger size 59B. The two fingers depicted in FIG. 5 can be located on one hand or two hands. The user may accomplish this by placing two fingers of the user at first locations 58A within the displayed block 21. While staying in contact with the multi-point interface 13, the user may spread the two fingers of the user outwardly to locations 58B. The dashed arrow lines 56 in FIG. 5 depict the movement of the fingers of the user across the multi-point interface 13. By removing the two fingers of the user from the multi-point interface 13, the displayed block 21 is resized into the second, larger size 59B.

The process depicted in FIG. 5 may be reversed to downsize a displayed element. For example, the user may bring the two fingers together, such as moving from locations 58B to locations 58A.

Figure 6:
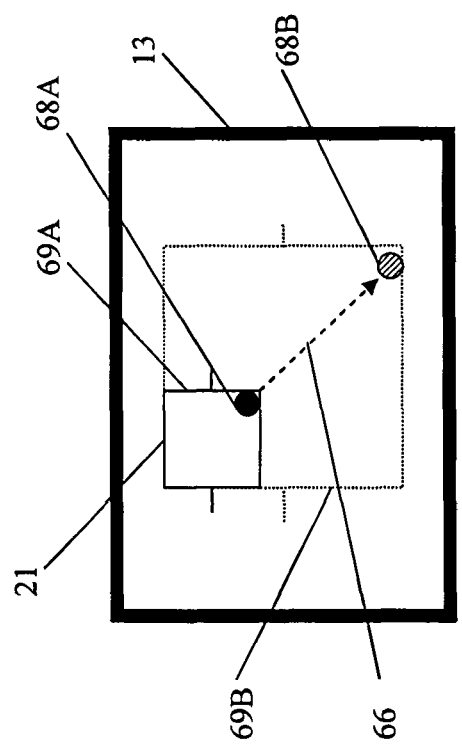
FIG. 6 depicts an exemplary multi-dimensional, single-finger resizing operation.

FIG. 6 depicts an exemplary multi-dimensional, single-finger resizing operation. In this embodiment of the invention, a user may resize a displayed element, such as a displayed block 21, on the multi-point interface 13 from a smaller size 69A to a larger size 69B. The user may accomplish this by placing one finger of the user at a first location 68A within the displayed block 21. While staying in contact with the multi-point interface 13, the user may move the finger of the user to location 68B. The dashed arrow lines 66 in FIG. 6 depict the movement of the fingers of the user across the multi-point interface 13. By removing the finger of the user from the multi-point interface 13, the displayed block 21 is resized into the second, larger size 69B.

The process depicted in FIG. 6 may be reversed to downsize a displayed element. For example, the user may move the finger from location 68B to location 68A.

Figure 7B:
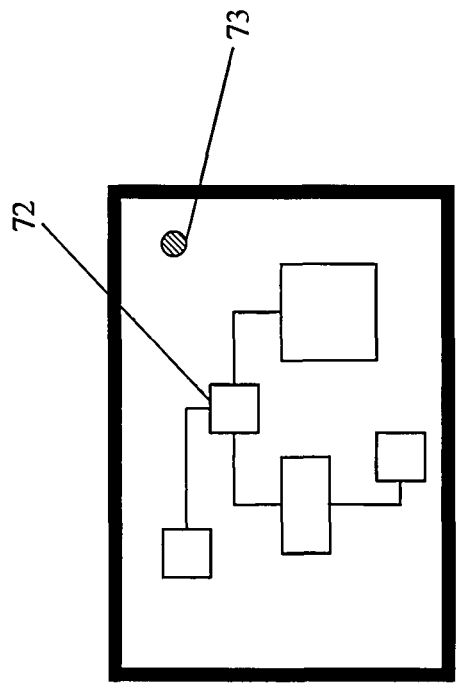
FIGS. 7A and 7B depict an exemplary single-finger hierarchical operation.
Figure 7A:
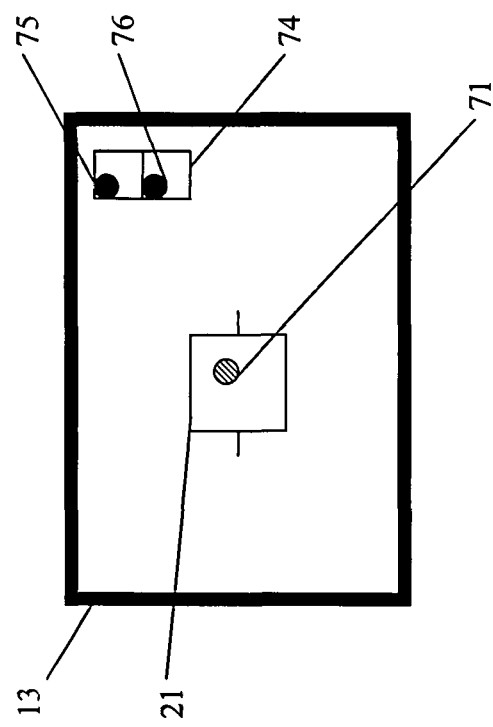

FIGS. 7A and 7B depict an exemplary single-finger hierarchical operation. In this embodiment of the invention, a user may view sub-elements 72, arranged in a hierarchy, under a displayed element, such as the displayed block 21, by uniquely touching the displayed block 21 at a location 71 on the multi-point interface 13. In FIG. 7A, the displayed block 21 is uniquely touched at the location 71. The unique manner of touching location 71 needed to view the hierarchy of sub-elements 72 may be, for example: pressing, with a finger, harder than normal or softer than normal at location 71; a quick tap of a finger of the user at location 71; pressing and holding a finger of the user at location 71; pressing down while wiggling a finger of the user at location 71; a series of taps by a finger or the user at location 71; moving a finger of the user in a vertical or horizontal line; or moving a finger of the user in a circular motion within the displayed block 21 around location 71. The location 71 may be inside the displayed block 21.

In FIG. 7B, the sub-elements 72, arranged in a hierarchy under the displayed block 21, are displayed to the user in response to a unique touch at location 71. Once the sub-elements 72, arranged in a hierarchy under the displayed block 21, are displayed a user may go down in the hierarchy to display sub-elements or up the hierarchy to display super-elements. A user may go down in the hierarchy by, for example, double-tapping on a subsystem or making a vertical stroke downward. A user may go up in the hierarchy by, for example, making a horizontal stroke from left to right or making a vertical stroke upwards. A set of one or more unique interactions (e.g., unique touches) may move into the hierarchy of the displayed block 21 to display sub-elements of block 21, and another set of interactions (e.g., unique touches) may move out of the hierarchy of the displayed block 21 to display super-elements of the displayed block 21.

The process depicted in FIGS. 7A and 7B may be reversed in order to exit the view of the hierarchy of sub-elements 72 under a displayed element, such as the displayed block 21. For example, in FIG. 7B, the user may uniquely touch a location 73. The location 73 may be outside any sub-elements 72.

In another embodiment of the hierarchical operation depicted in FIGS. 7A and 7B, the user may view sub-elements 72, arranged in a hierarchy under the displayed block 21, in FIG. 7A, by pressing and holding a first finger of the user at location 71, within the displayed block 21, and by touching a menu 74, displayed by the multi-point interface 13, at a location 76 with a second finger to move down in the hierarchy or by touching the menu 74, displayed by the multi-point interface 13, at a location 75 with the second finger to move up in the hierarchy.

Figure 8B:
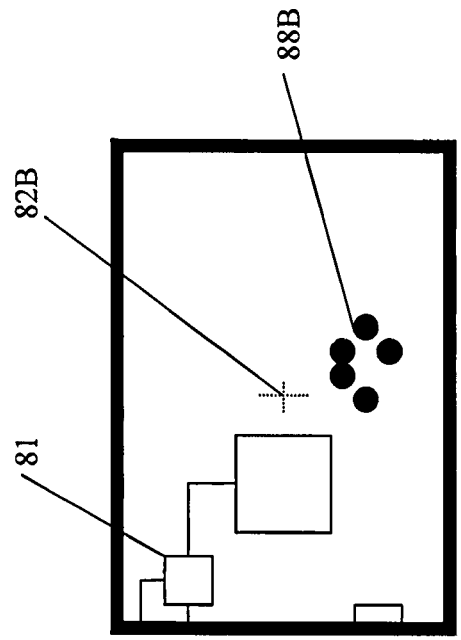
FIGS. 8A and 8B depict an exemplary multi-finger pan operation.
Figure 8A:
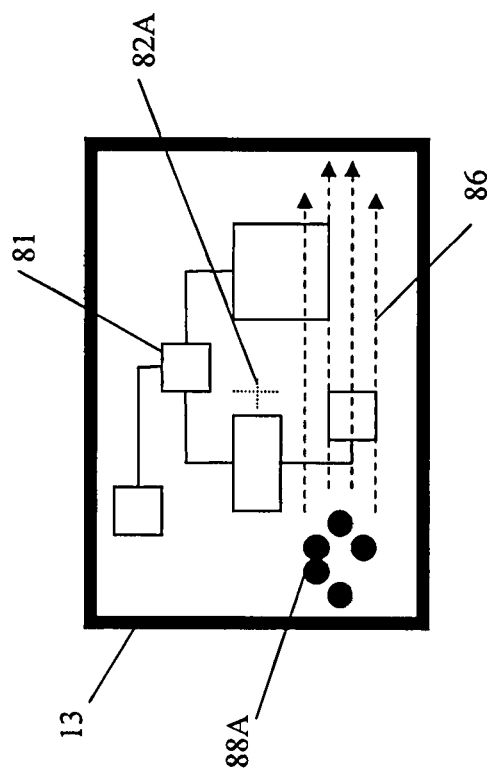

FIGS. 8A and 8B depict an exemplary multi-finger pan operation. In this embodiment of the invention, a user may pan from a view having a first center point 82A of a displayed graphical model 81 on a multi-point interface 13, to a view having a second center point 82B of the displayed graphical model 81 on the multi-point interface 13. In FIGS. 8A and 8B, the center points 82A and 82B, respectively, are illustrated with dotted crosses, which are not shown on the interface 13 but are shown here for illustration purposes. In FIG. 8A, the user may accomplish this by placing fingers of the user at a first location 88A within the displayed graphical model 81. While staying in contact with the multi-point interface 13, the user may move the fingers to a second location 88B. The dashed arrow lines 86 in FIG. 8A depict the movement of fingers of the user across the multi-point interface 13.

In FIG. 8B, by removing the fingers of the user from the multi-point interface 13 at the second location 88B, the view of the graphical model 81 having second center point 82B is selected.

In one alternate embodiment of the pan operation depicted in FIGS. 8A and 8B, a user may be able to place fingers at the first location 88A, briefly move the fingers in the direction of the second location 88B, remove the fingers while the pan operation of the displayed model continues, and tap the fingers at the second location 88B to stop the pan operation at the second center point 82B. In another embodiment, a pan operation may be conducted with a single finger of the user.

Figure 9A:
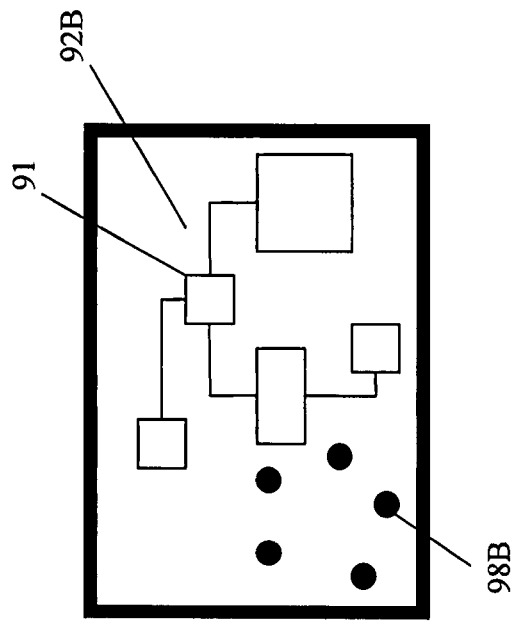
FIGS. 9A and 9B depict an exemplary multi-dimensional, multi-finger zoom operation.
Figure 9B:
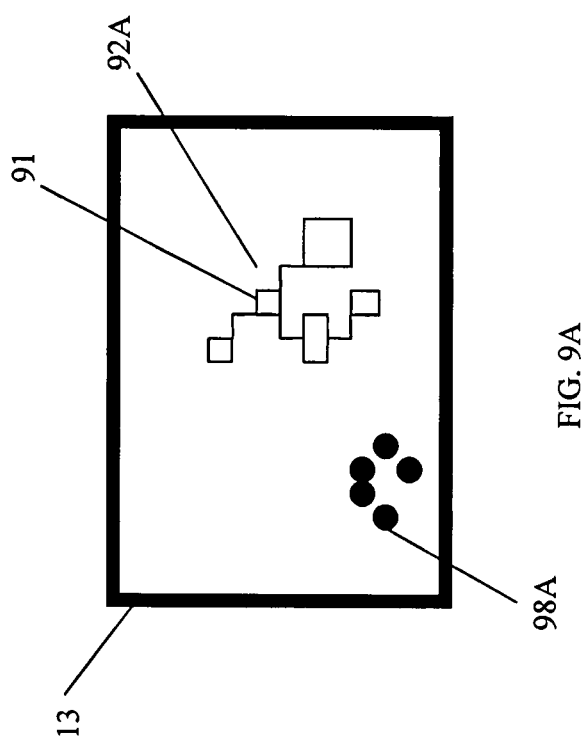

FIGS. 9A and 9B depict an exemplary multi-dimensional, multi-finger zoom operation. In this embodiment of the invention, a user may zoom in on a displayed element, such as a system of blocks 91, on the multi-point interface 13 from a zoomed out view 92A to a zoomed in view 92B. In FIG. 9A, the user may accomplish this by placing fingers of the user at a first location 98A.

In FIG. 9B, while staying in contact with the multi-point interface 13, the user may spread the fingers of the user outwardly to a second location 98B. By removing the fingers of the user from the multi-point interface 13, the system of blocks is displayed from the zoomed in view 92B.

The process depicted in FIGS. 9A and 9B may be reversed to zoom out. For example, the user may bring the fingers together to zoom out, such as going from locations 98B to locations 98A.

Figure 10B:
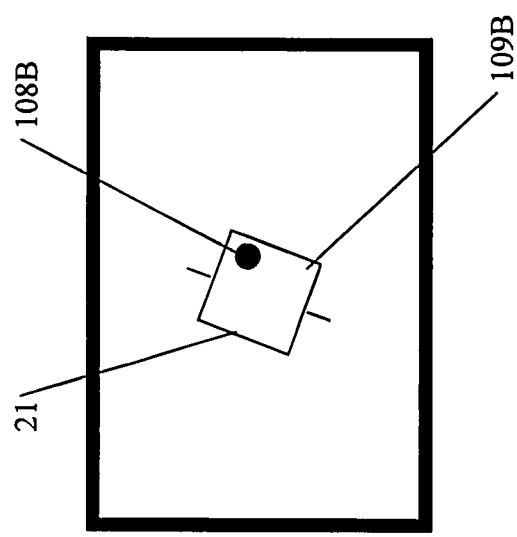
FIGS. 10A and 10B depict an exemplary multi-dimensional, single-finger rotate operation.
Figure 10A:
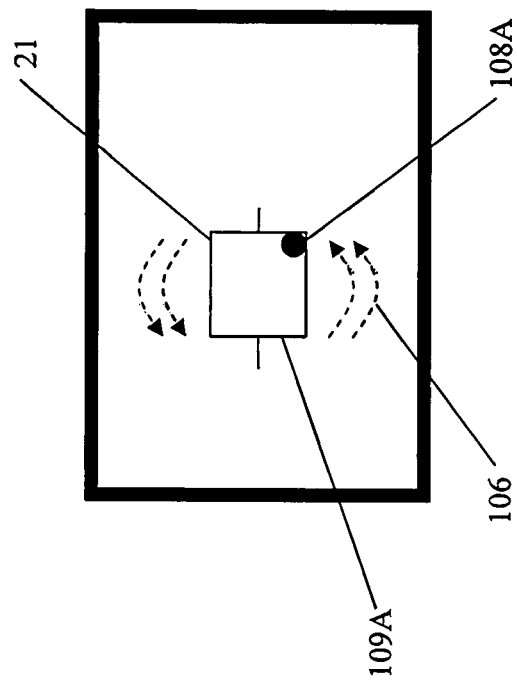

FIGS. 10A and 10B depict an exemplary multi-dimensional, single-finger rotate operation. In this embodiment of the invention, a user may rotate a displayed element, such as a displayed block 21, on the multi-point interface 13 from a first position 109A to a second position 109B. In FIG. 10A, the user may accomplish this by placing one finger of the user at a first location 108A within the displayed block 21. While staying in contact with the multi-point interface 13, the user may move the finger of the user to a second location 108B. The dashed arrow lines 106 in FIG. 10A depict the movement of the finger of the user and rotation movement of the displayed block 21.

In FIG. 10B, by removing the finger of the user from the multi-point interface 13, the displayed block 21 is set in the second location 109B.

In another embodiment of the rotate operation depicted in FIGS. 10A and 10B, a rotate operation may be conducted with multiple fingers of the user by, for example, using a first finger of the user to indicate the point of rotation, and a second finger of the user to indicate an angle of rotation. The angle of rotation may be indicated in absolute terms (e.g., with respect to a reference like, for example, the horizontal) or in relative terms (e.g., with respect to the first point of contact of the second finger).

FIGS. 11A and 11B depict an exemplary connect operation. In this embodiment of the invention, a user may connect two displayed elements, such as a first displayed block 110 to a second displayed block 111, on the multi-point interface 13. In FIG. 11A the user may accomplish this by touching a connection port 112 on the first displayed block 110 and then touching a connection port 113 on the second displayed block 111.

In FIG. 11B, after touching the connection ports 112 and 113 a connection 115 is generated between the connection port 112 on the first displayed block 110 and the connection port 113 on the second displayed block 111. Thereafter, if either the first display block 110 or the second display block 111 are manipulated, for example, by one of the operations depicted in FIGS. 2C-11B the connection 115 is adjusted accordingly.

The process depicted in FIGS. 11A and 11B may be reversed to remove the connection 115. For example, in FIG. 11B, the user may touch connection port 112 and then connection port 113 to remove connection 115.

In another embodiment of the connect operation depicted in FIGS. 11A and 11B, the user may create a connection 115 by touching-connection port 112 of the first displayed block 110 with a finger of the user and, while staying in contact with the multi-point interface 13, moving the finger of the user to connection port 113 of the second displayed block 111. The user may then remove the finger from the multi-point interface 13 to create connection 115.

In yet another embodiment of the connect operation depicted in FIGS. 11A and 11B, the user may connect multiple output connection ports to multiple input connection ports. To accomplish this, the user may select multiple output connection ports by circling them with a finger, select multiple input connection ports by circling them with a finger, and then moving a finger in a line between the input and the output connection ports to establish a connection.

Figure 12B:
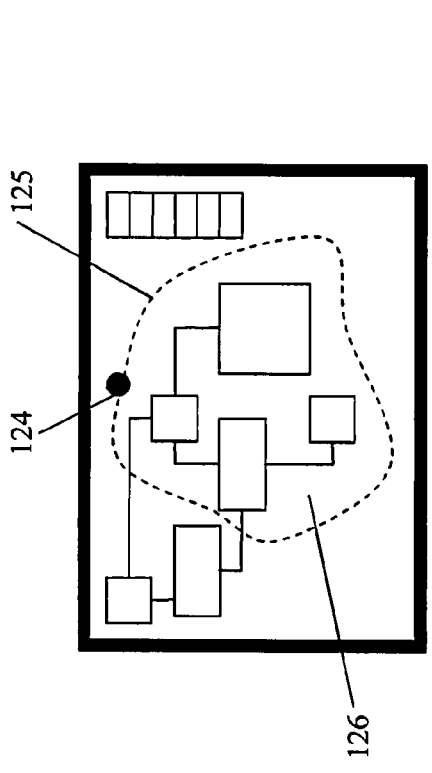
FIGS. 12A-12D depict an exemplary single-finger, multi-dimensional protect and partition operation.
Figure 12D:
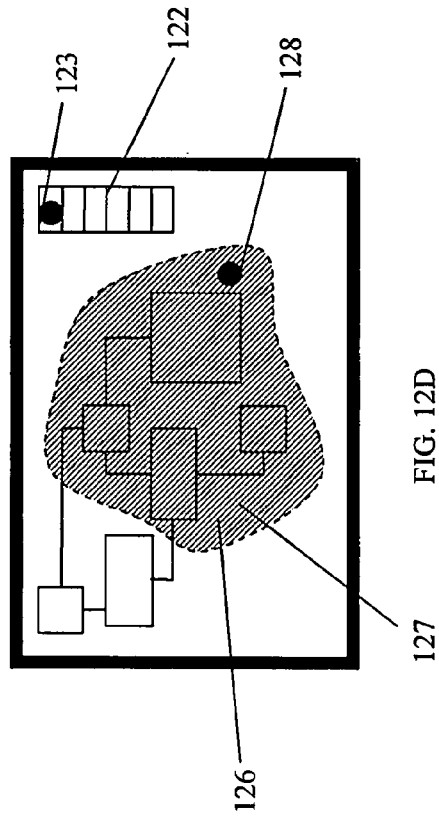
Figure 12A:
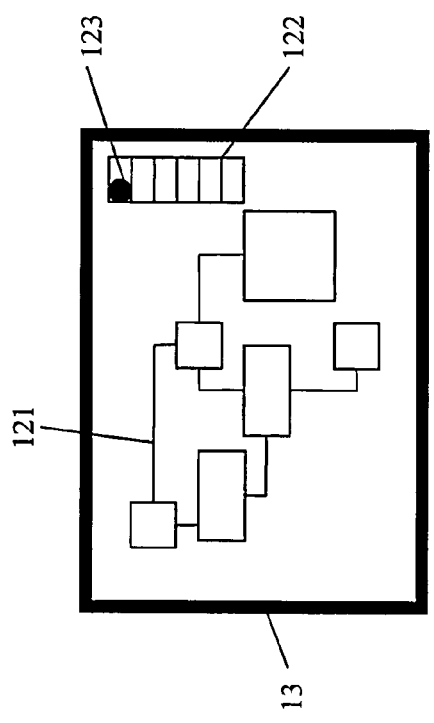

FIGS. 12A-12D depict an exemplary single-finger, multi-dimensional protect and partition operation. In this embodiment of the invention, a user may protect and partition an area of a graphical model 121 displayed on the multi-point interface 13. When an area is protected and partitioned it may not be edited. In FIG. 12A, the user may enable a protect and partition operation, for example, by touching a menu 122 at a location 123, displayed by the multi-point interface 13, with a finger.

In FIG. 12B, the user may outline an area 126 of the graphical model 121 with a finger by moving the finger on the multi-point interface 13 from a location 124 around the perimeter of the area 126. The path of the finger of the user is indicated by the dashed line 125.

Figure 12C:
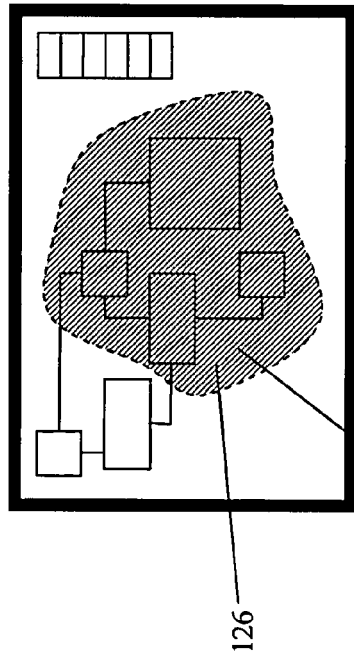

In FIG. 12C, the finger of the user is removed from the multi-point interface 13, and an area 126 of the displayed model 121, indicated by the shaded area 127, is protected and partitioned from the other areas of the graphical model 121.

In FIG. 12D, a user may disable a protect and partition operation by touching a location 128, within the area 126 with a finger, and then disabling the protect and partition operation by touching the menu 122 at a location 123, displayed by the multi-point interface 13, with a finger.

FIGS. 13A and 13B depict an exemplary multi-element selection operation. In this embodiment of the invention, a user may select, and simultaneously work with, multiple elements, such as displayed blocks 134, by touching the displayed blocks 134 in a specific manner at a location 135 on the multi-point interface 13. In FIG. 13A, the user enables a multi-element selection operation, for example, by touching a menu 132 at location 133, displayed by the multi-point interface 13, with a finger. The user may then select multiple blocks 134, with a finger, by touching each of the displayed blocks 134 on the multi-point interface 13 in a specific manner at a location 135. The specific manner of touching displayed blocks 134 at location 135 may be, for example: touching each of the displayed blocks 134 simultaneously; touching each of the displayed blocks within a specified time period after touching the menu 132 at location 133; or by continuously touching the menu 132 at location 133 with one finger of a user while simultaneously selecting displayed blocks 134 with another hand of a user.

In FIG. 13B, the multiple blocks 134 are selected, as indicated by the displayed blocks 134 in dotted line, and may be operated on simultaneously. While the displayed blocks 134 are selected any common property may be simultaneously manipulated. This may include, for example, their size, their orientation to other elements, their internal values, their internal operations, their color or other graphical attributes, or their functional behavior, such as simulation or code-generation behavior. In FIG. 13B, a user may deselect displayed blocks 134 by, for example: touch the menu 132 at location 133, displayed by the multi-point interface 13, with a finger; or touching a location 136 on the multi-point interface 13 which may be outside of the selected displayed blocks 134.

Figure 14A:
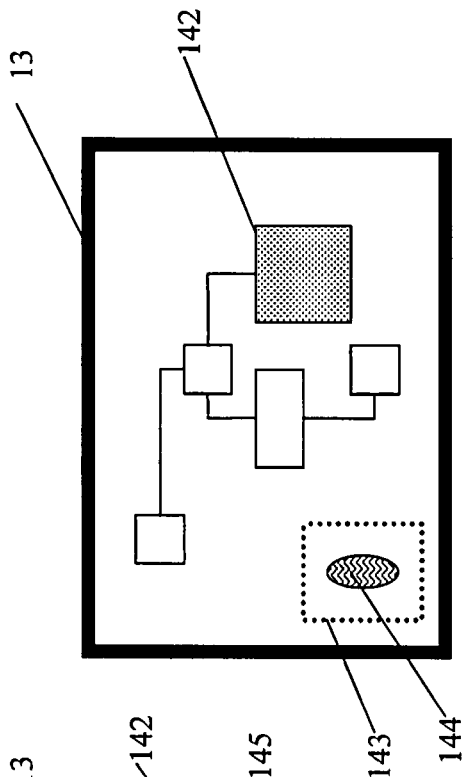
FIGS. 14A and 14B depict an exemplary fingerprint access operation.
Figure 14B:
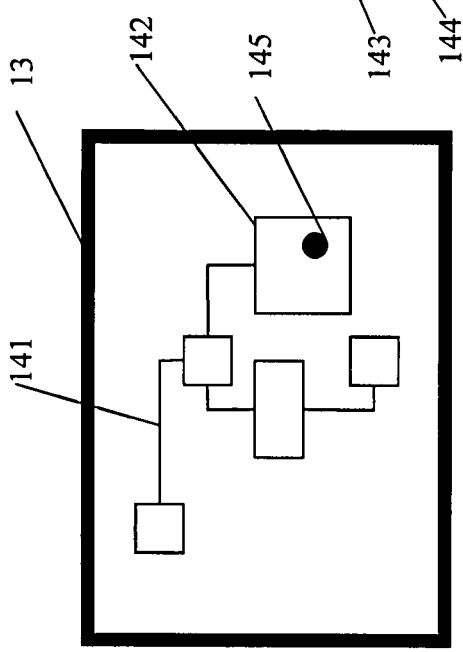

FIGS. 14A and 14B depict an exemplary fingerprint access operation. In this embodiment of the invention, a user may be allowed to manipulate an element of a displayed graphical model 141 on the multi-point interface 13 which has restricted access, such as a restricted block 142, by submitting a finger print for authorization. When a display block has restricted access it cannot be edited by an unauthorized user. In FIG. 14A, the user enables a fingerprint access operation, for example, by touching 145 the restricted block 142 on the multi-point interface 13 with a finger.

In FIG. 14B, an authorization window 143 appears on the multi-point interface 13 in response to the touch 145. The user submits a fingerprint 144 for authorization by placing a finger on the multi-point interface 13 within the authorization window 143. If the user is authorized to edit the restricted block 142, the user's fingerprint will permit access, as indicated by the shaded block 142. The user may then edit restricted block 142.

The process depicted in FIGS. 14A and 14B may be reversed to protect all or part of a displayed graphical model 141. For example, in FIG. 14B, the user may enable a fingerprint access operation in order to prevent unauthorized individuals from editing restricted block 142.

In another embodiment of the fingerprint access operation depicted in FIGS. 14A and 14B, a user can access, or restrict, all of a displayed graphical model 141 through a fingerprint access operation.

FIGS. 15A-15C depict an exemplary record and assign operation. In this embodiment of the invention, a user may record a unique motion and assign the unique motion to a specific function within the graphical modeling environment 12. After the specific function has been assigned to the unique motion in a record and assign operation, the unique motion may be sufficient to execute the specific function. In FIG. 15A, the user may enable the record and assign operation, for example, by pressing and holding a first finger on a menu 150 at a location 151, displayed by the multi-point interface 13. The user may then select the specific function to be assigned to the unique motion, for example, by touching the menu 150 at a location 152, displayed by the multi-point interface 13, with a second finger. For example, the specific function may be to display a system of interconnected blocks 156 on the multi-point interface 13. The user may then record the unique motion, for example, by placing a finger at a first location 153 and, while staying in contact with the multi-point interface 13, moving the finger of the user to a second location 155 before removing the finger of the user from the multi-point interface 13. The dashed line 154 in FIG. 15A depicts the movement of the finger of the user.

In FIG. 15B, after the unique motion is recorded, the user may again make the unique motion, for example, by placing a finger at the first location 153 and, while staying in contact with the multi-point interface 13, moving the finger of the user to the second location 155 before removing the finger of the user from the multi-point interface 13. The dashed line 154 in FIG. 15B depicts the movement of the finger of the user. The computer system 11 recognizes the unique motion and triggers the specific function assigned to the unique motion.

In FIG. 15C, the specific function may be executed by the graphical modeling environment and displayed on the multi-point interface 13. In this example, the specific function triggers a system of interconnected blocks 156 to be displayed by the multi-point interface 13.

Figure 16:
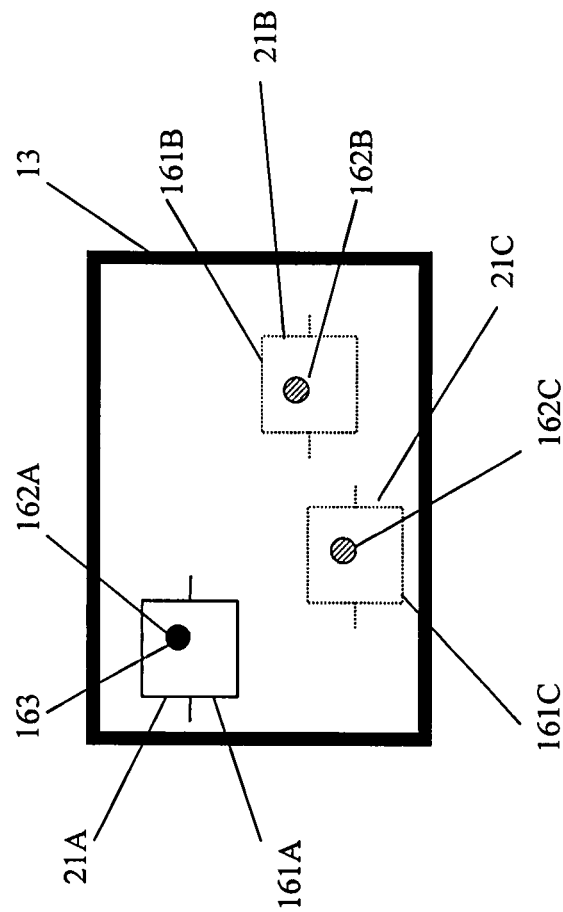
FIG. 16 depicts an exemplary copy and past operation.

FIG. 16 depicts an exemplary copy and past operation. In this embodiment of the invention, a user may copy a displayed element, such as displayed block 21A, on the multi-point interface 13 and paste a copy of the displayed block 21A to a second location 161B as displayed block 21B. The user may enable a copy operation by pressing and holding a first finger at a first location 162A inside the displayed block 21A, located at a first position 161A, on the multi-point interface 13. By placing a second finger at a second location 162B the user may enable a paste operation. The paste operation may create a copy of displayed block 21A at a second location 161B as displayed block 21B. While continuing to hold the first finger at the first position 161A, the user may create a third copy of displayed block 21A at a third location 161C as displayed block 21C.

In another embodiment of the copy and paste operation depicted in FIG. 16, the user may enable a copy operation by selecting the displayed element 21A from a menu, displayed by the multi-point interface 13, with the first finger of the user and placing the second finger of the user at the second location 162B to create a copy of the displayed block 21A at the second location 161B as displayed block 21B.

Figure 17:
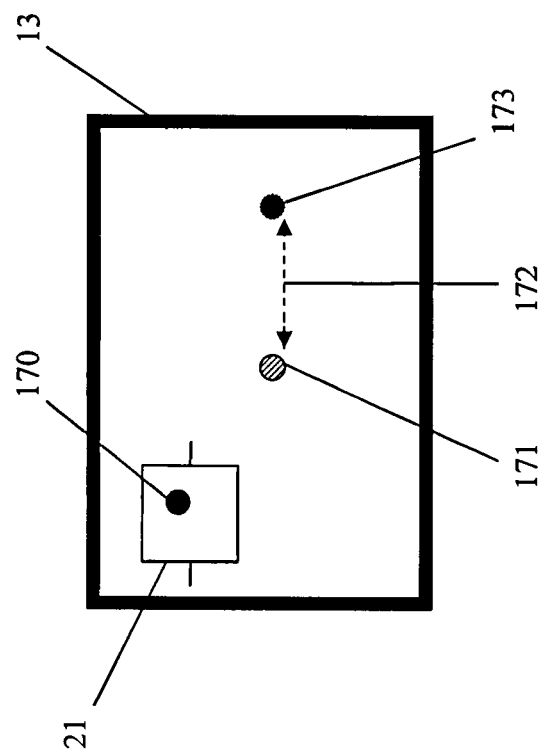
FIG. 17 depicts an exemplary parameter modification operation.

FIG. 17 depicts an exemplary parameter modification operation. In this embodiment of the invention, a user may adjust a parameter value of a displayed element, such as displayed block 21. The user may accomplish this by continuously touching the displayed block 21 with a first finger of the user at a first location 170 in relation to the displayed block 21 while simultaneously modifying the parameter value with a second finger of the user. By moving the second finger of the user from location 171 to location 173, along path 172, the user may, for example, increase the parameter value of the displayed block 21.

The process depicted in FIG. 17 may be reversed to decrease the parameter value of the displayed block 21 by moving the second finger of the user from location 173 to location 171, along path 172.

In another embodiment of the parameter modification operation of FIG. 17, the user may increase or decrease the parameter value of the displayed block 21 in a linear scale by moving one finger of the user along path 172 or in a logarithmic scale by moving two fingers of the user along path 172.

The interactions described above in relation to FIGS. 2A-17 can be performed on any displayed element within the graphical modeling environment 11. Displayed elements may be, for example: a block, a system of blocks, plots, scopes, data graphics, graphical user interface elements, signal lines, states, diagrams, junctions, connections, annotations, boxes, graphical functions, state transitions, among others.

FIG. 18 depicts an exemplary multi-user operation. In this embodiment of the invention, at least a first user 180A and a second user 180B may simultaneously work on a multi-point interface 13 of an arbitrarily large size. The multi-point interface 13 may be able to recognize the relationship between multiple touches by multiple users, such as first user 180A and second user 180B, such that the multiple users can interact with the graphical modeling environment in the manner described in FIGS. 2A-17. For example, in FIG. 18 user 180A may be performing a protect and partition operation, depicted in FIG. 12A-12C, while user 180B may be simultaneously performing a multi-element selection operation, depicted in FIGS. 13A and 13B.

FIGS. 19A and 19B depict an exemplary distributed computing operation. In this embodiment of the invention, a user may allow multiple multi-point interfaces 13B-13D to manipulate multiple sections 190A-190C of a displayed graphical model 191 displayed on a single multi-point interface 13A. In FIG. 19A, the user may enable a distributed computing operation, for example, by touching a menu 192 at a location 193, displayed by the multi-point interface 13A, with a finger. The user may then divide the graphical model 191 into three sections 190A-190C.

In FIG. 19B, the user distributes the three sections 190A-190C of the graphical model 191 to three multi-point interfaces 13B-13D where modeling operations may then be performed on each individual section 190A-190C. The same process can be reversed to place the three sections 190A-190C back into a single displayed graphical model 191. The multi-point interfaces 13A-13D may be connected to the same computer or computer system 11 or to different computers or computer systems 11, which are connected via a network.

In another embodiment of the distributed computing operation depicted in FIGS. 19A and 19B, the three sections 190A-190C may remain on multi-point interface 13A and may be processed by a distributed backend computer system having several different computer systems connected via a network. For example, section 190A may be processed by a first computer system, section 190B may be processed by a second computer system, and section 190C may be processed by a third computer system.

Figure 20:
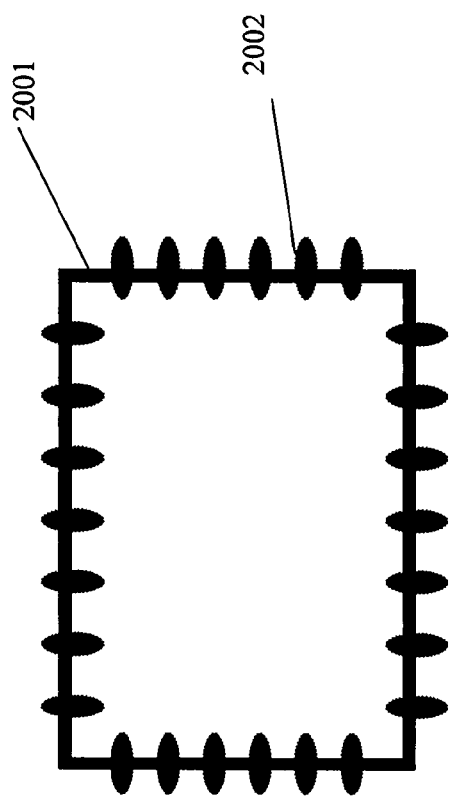
FIG. 20 depicts an exemplary embodiment of the multi-point interface.

FIG. 20 depicts an exemplary embodiment of the multi-point interface implemented in accordance with frustrated total internal reflection ("FTIR") technology. In FIG. 20, the multi-point interface 2001 contains multiple light emitting diodes (LEDs) 2002 placed around the perimeter of the multi-touch interface 13. Instead of using a multi-point interface 13 as discussed with respect to FIG. 1 above, the multi-point interface 2001 with LEDs 2002 may be used. Using such an interface to receive input from a user is discussed in, for example, Jefferson Y. Han, "Low-Cost Multi-Touch Sensing Through Frustrated Total Internal Reflection", ACM Symposium on User Interface Software and Technology, 115-118 (2005). The multi-point interface 2001 allows the user to interact with the graphical modeling environment in the manner described in FIGS. 2A-19B.

Figure 21:
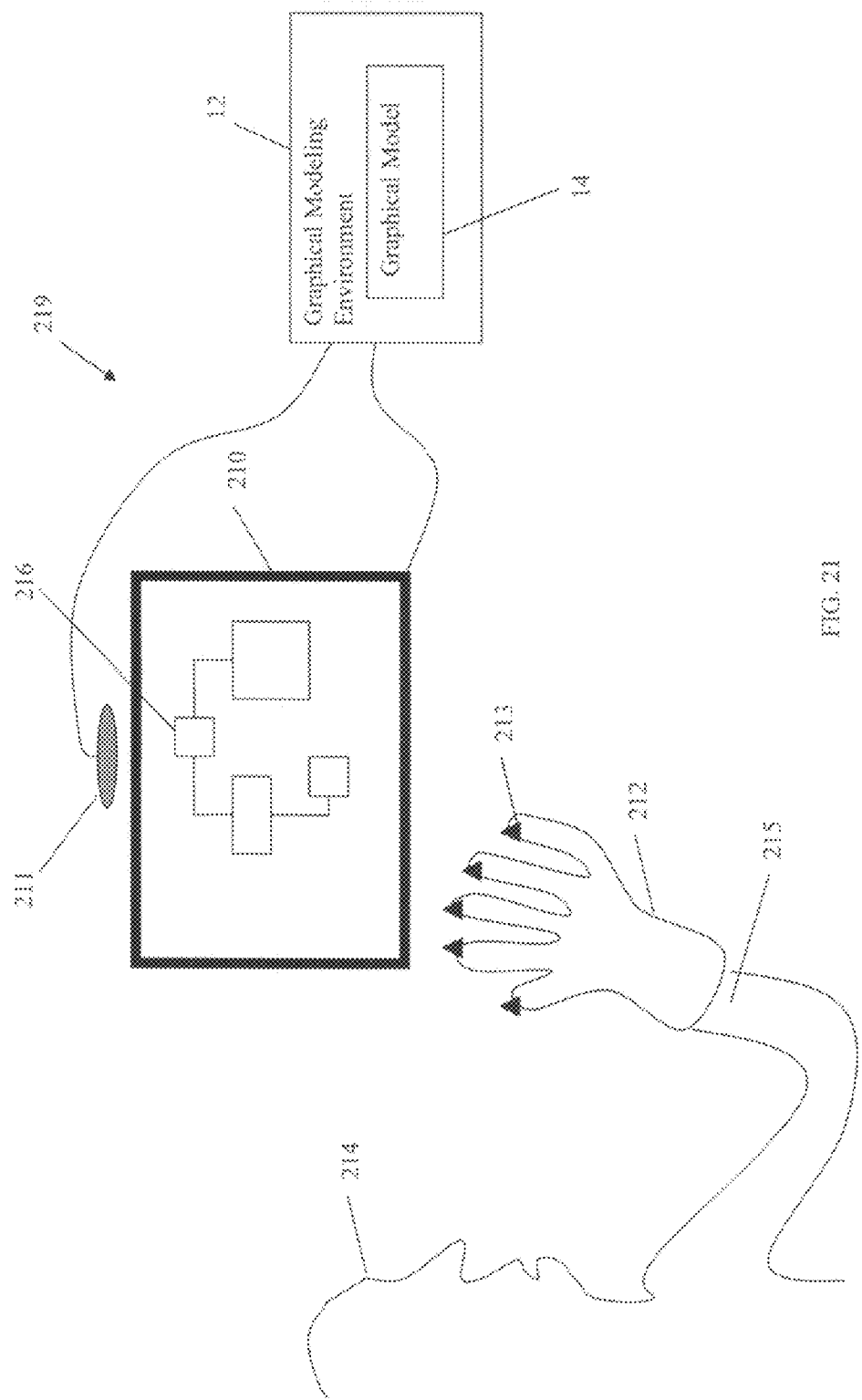
FIG. 21 depicts an exemplary embodiment of the computer-implemented graphical modeling system.

FIG. 21 depicts an exemplary embodiment of the computer-implemented graphical modeling system that utilizes a glove. Instead of using a multi-point interface 13 as discussed with respect to FIG. 1 above, a glove 212, a screen 210, and a camera 211 may be used. The computer-implemented graphical modeling system may include a computer system 219. The computer system 219 may include a graphical modeling environment 12 running on the computer system 219, a camera 211 to provide input to the computer system 219, a screen 210 to provide output for the computer system 219, and a glove 212. The glove 212 may include at least one light source 213 and may fit on a hand 215 of a user 214. The light source 213 may be located at the ends of the fingers on the glove 212. The light source may be, for example, light emitting diodes, halogen light bulbs, reflected ambient light, incandescent light bulbs that emit, for example, infrared, ultraviolet, or visible light, or self-illuminating sources (e.g., tritium), etc. The screen 210 may display to the user 214 a displayed graphical model 216 from the graphical modeling environment 12. The computer system 219 may recognize movements of the hand 215 of the user 214 via the camera 211 by tracking the movements of the light sources 213. The ability of the computer system 219 to track the movements of the light source 213 enables the camera 211 and the glove 212 to act as an interface between the user and the graphical modeling environment 12. The interface, comprised of the glove 212 and at least one light source 213, allows the user to interact with the graphical modeling environment in the manner described in FIGS. 2A-19B.

In another exemplary embodiment of the computer-implemented graphical modeling system depicted in FIG. 21, the graphical modeling system may utilize a screen 210 and a camera 211 without a glove 212. The computer-implemented graphical modeling system may include a computer system 219. The computer system 219 may include a graphical modeling environment 12 running on the computer system 219, a camera 211 to provide input to the computer system 219, and a screen 210 to provide output for the computer system 219. The computer system 219 may recognize movements of the hand 215 of the user 214 via the camera 211 and an image processing algorithm.

In another embodiment of the computer-implemented graphical modeling system depicted in FIG. 21, the camera may track the movements of multiple light sources 213 located at multiple points on multiple gloves 212. The interface, comprised of the camera 211 and multiple gloves 212, enables multi-hand and multi-finger interaction with the graphical modeling system in which the camera 211 can simultaneously register movement from multiple light sources 213 on multiple gloves 212. The multi-hand and multi-finger interaction results in a manipulation of the displayed graphical model 216 by multiple users in the manner described in FIGS. 2A-19B above.

Figure 22:
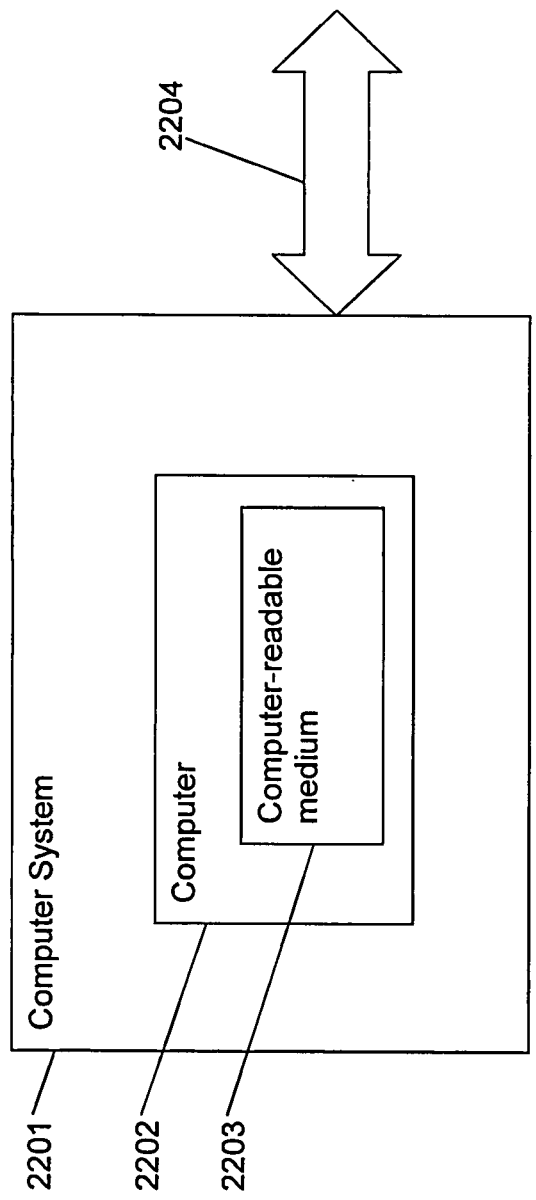
FIG. 22 depicts an exemplary computer system for use with various exemplary embodiments.

FIG. 22 depicts a computer system for use with embodiments of the present invention. The computer system 2201 may include a computer 2202 for implementing the invention. The computer 2202 may include a computer-readable medium 2203 embodying software for implementing the invention and/or software to operate the computer 2202 in accordance with the invention. As an option, the computer system 2201 may include a connection to a network 2204. With this option, the computer 2202 is able to send and receive information (e.g., software, data, documents) from other computer systems via the network 2204. As another example, the computer system 2201 and/or the computer 2202 may implement the graphical modeling system.

Figure 23:
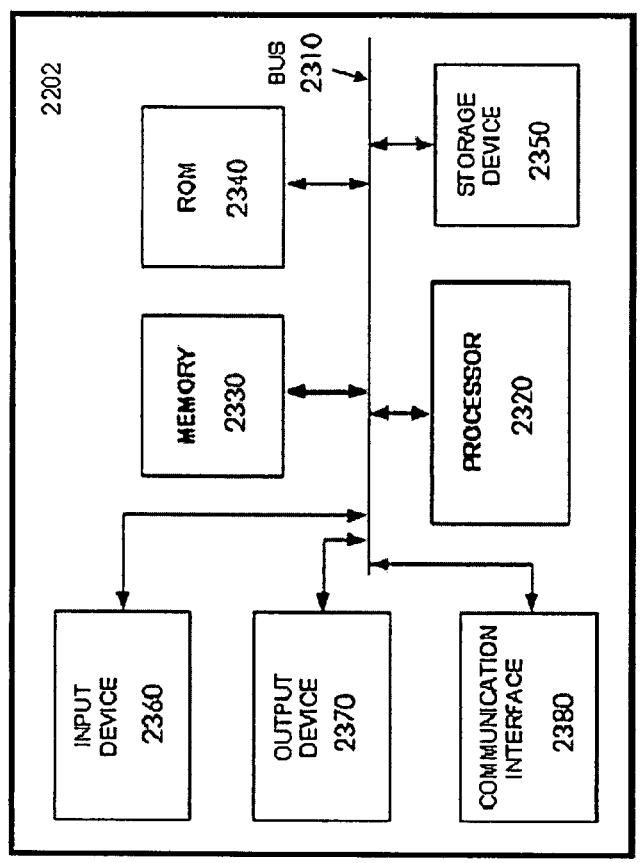
FIG. 23 depicts an exemplary computer architecture for use with the various exemplary embodiments.

FIG. 23 illustrates an exemplary architecture for implementing computer 2202 of FIG. 20. It will be appreciated that other devices that can be used with the computer 2202, such as a client or a server, may be similarly configured. As illustrated in FIG. 23, computer 2202 may include a bus 2310, a processor 2320, a memory 2330, a read only memory (ROM) 2340, a storage device 2350, an input device 2360, an output device 2370, and a communication interface 2380.

Bus 2310 may include one or more interconnects that permit communication among the components of computer 2202. Processor 2320 may include any type of processor, microprocessor, or processing logic that may interpret and execute instructions (e.g., a field programmable gate array (FPGA)). Processor 2320 may include a single device (e.g., a single core) and/or a group of devices (e.g., multi-core). Memory 2330 may include a random access memory (RAM) or another type of dynamic storage device that may store information and instructions for execution by processor 2320. Memory 2330 may also be used to store temporary variables or other intermediate information during execution of instructions by processor 2320.

ROM 2340 may include a ROM device and/or another type of static storage device that may store static information and instructions for processor 2320. Storage device 2350 may include a magnetic disk and/or optical disk and its corresponding drive for storing information and/or instructions. Storage device 2350 may include a single storage device or multiple storage devices, such as multiple storage devices operating in parallel. Moreover, storage device 2350 may reside locally on computer 2202 and/or may be remote with respect to computer 2202 and connected thereto via a network and/or another type of connection, such as a dedicated link or channel.

Input device 2360 may include any mechanism or combination of mechanisms that permit an operator to input information to computer 2202, such as a keyboard, a mouse, a touch sensitive display device, a microphone, a pen-based pointing device, an accelerometer-based device, a gyroscope-based device and/or a biometric input device, such as a voice recognition device and/or a finger print scanning device. Output device 2370 may include any mechanism or combination of mechanisms that outputs information to the operator, including a display, a printer, a speaker, etc. The input device 2360 and the output device 2370 may also be combined into an interface device, such as a touch sensitive display device or a device. Implemented in accordance with frustrated total internal reflection ("FTIR") technology.

Communication interface 2380 may include any transceiver-like mechanism that enables computer 2202 to communicate with other devices and/or systems, such as a client, etc. For example, communication interface 2380 may include one or more interfaces, such as a first interface coupled to a network and/or a second interface coupled to another device. Alternatively, communication interface 2380 may include other mechanisms (e.g., a wireless interface) for communicating via the network, such as a wireless network. In one implementation, communication interface 2380 may include logic to send code to a destination device, such as a target device that can include general purpose hardware (e.g., a personal computer form factor), dedicated hardware (e.g., a digital signal processing (DSP) device adapted to execute a compiled version of a model or a part of a model), etc.

Computer 2202 may perform certain functions in response to processor 2320 executing software instructions contained in a computer-readable medium, such as memory 2330. In alternative embodiments, hardwired circuitry may be used in place of or in combination with software instructions to implement features consistent with principles of the invention. Thus, implementations consistent with principles of the invention are not limited to any specific combination of hardware circuitry and software.

The examples and embodiments described herein are non-limiting examples.

While various exemplary embodiments have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

What is claimed is:

1. A computer-implemented method for displaying a graphical model on a display, the method comprising:
    displaying the graphical model on the display, the display including a substantially planar surface for receiving tactile input from a user and for allowing the user to view the graphical model; and
    manipulating the displayed graphical model based on an interaction between the user and the display, where the interaction includes:
        receiving a first tactile input from the user on a first connection port, where the first connection port is associated with a first displayed element of the graphical model;
        receiving a second tactile input from the user on a second connection port, where the second connection port is associated with a second displayed element of the graphical model; and
        connecting or disconnecting the first displayed element and the second displayed element using the selected first connection port and the second connection port.

2. The method of claim 1, wherein the first tactile input from the user and the second tactile input from the user is selected from the group consisting of:
    one finger on one hand;
    one finger on one hand and one finger on another hand;
    a plurality of fingers on one hand;
    one finger on one hand and a plurality of fingers on another hand; and
    a plurality of fingers on one hand and a plurality of fingers on another hand.

3. The method of claim 1, wherein a first location of the first tactile input from the user or the second tactile input by the user is selected from the group consisting of:
    within an element of the displayed graphical model;
    outside of an element of the displayed graphical model;
    within a menu displayed on the display;
    within a portion of the display not including the displayed graphical model;
    around the perimeter of an element of the displayed graphical model;
    on the perimeter of an element of the displayed graphical model.

4. The method of claim 1, further comprising:
    sensing a movement of the first tactile input from the user, wherein the movement is selected from the group consisting of:
        a motion of a finger;
        motions of a plurality of fingers;
        a series of motions of a finger; and
        a series of motions of a plurality of fingers.

5. The method of claim 1, further comprising:
    adjusting the displayed graphical model in response to the sensed movement of the first tactile input from the user, wherein adjusting the displayed graphical model is selected from the group consisting of:
        dragging and dropping an element in the displayed graphical model;
        resizing an element in the displayed graphical model;
        displaying a hierarchy of sub-elements for an element displayed graphical model;
        displaying a hierarchy of super-elements for an element displayed graphical model;
        panning across a view of the displayed graphical model;
        rotating an element in the displayed graphical model;
        connecting or disconnecting elements in the displayed graphical model;
        protecting and partitioning an area of the displayed graphical model;
        simultaneously selecting a plurality of elements in the displayed graphical model;
        copying and pasting an element in the displayed graphical model;
        modifying a parameter of an element in the displayed graphical model; and
        granting a user access to the displayed graphical model.

6. The method of claim 5, further comprising:
    prior to the adjusting step:
        sensing a fingerprint of the user; and
        authorizing the user to adjust the displayed graphical model based on the sensed movement of the first tactile input from the user when the fingerprint is recognized; and
        adjusting the displayed graphical model in response to the sensed movement of the first tactile input by the authorized user to obtain an adjusted displayed graphical model.

7. The method of claim 1, further comprising:
    sensing a plurality of combinations of locations and movements of the first tactile input by the user, wherein the displayed graphical model is adjusted based on the plurality of combinations.

8. The method of claim 1, wherein the first tactile input from the user is sensed by a frustrated total internal reflection (FTIR) system comprising the display.

9. A computer-implemented method for displaying the dependencies of model elements, comprising:

downloading software to a computer system and storing the software in a non-transitory computer-readable storage medium, which software when executed by the computer system causes the computer system to perform operations comprising the method of claim 1.

10. A computer-implemented method for displaying the dependencies of model elements, comprising:
providing downloadable software to download to a computer system and storing the software in a non-transitory computer-readable storage medium, which software when executed by the computer system causes the computer system to perform operations comprising the method of claim 1.

11. A non-transitory computer-readable medium comprising software, which when executed by a computer, causes the computer to perform operations for displaying a graphical model on a display, the medium comprising:
instructions for displaying the graphical model on the display;
instructions for receiving tactile input from a user and manipulating the displayed graphical model based on an interaction between the user and the displayed graphical model, where the interaction includes one of:
part of the user interacting with the display or
the part and another part of the user simultaneously interacting with the display; and
instructions for manipulating the displayed graphical model, where the manipulating includes:
partitioning an area in the displayed graphical model with respect to non-partitioned areas of the displayed graphical model, and
protecting the partitioned area, where the protecting prevents editing the partitioned area in response to the received tactile input, and
where the partitioning excludes interfering with editable aspects of the non-partitioned areas of the displayed graphical model in response to the received tactile input.

12. The non-transitory computer-readable medium of claim 11, wherein the part of the user is selected from the group consisting of:
one finger on one hand;
one finger on one hand and one finger on another hand;
a plurality of fingers on one hand;
one finger on one hand and a plurality of fingers on another hand; and
a plurality of fingers on one hand and a plurality of fingers on another hand.

13. The non-transitory computer-readable medium of claim 11, wherein a location of the tactile input from the user is selected from the group consisting of:
within an element of the displayed graphical model;
outside of an element of the displayed graphical model;
within a menu displayed on the display;
within a portion of the display not including the displayed graphical model;
around the perimeter of an element of the displayed graphical model;
on the perimeter of an element of the displayed graphical model;
and on a connection port of an element of the displayed graphical model.

14. The non-transitory computer-readable medium of claim 11, further comprising:
instructions for recognizing a motion of the part of the user, wherein the motion of the part of the user is selected from the group consisting of:
an action of a finger;
actions of a plurality of fingers;
a series of actions of a finger; and
a series of actions of a plurality of fingers.

15. The non-transitory computer-readable medium of claim 14, further comprising:
instructions for modifying the displayed graphical model in response to the recognized motion of the part of the user, wherein instructions for modifying the displayed graphical model is selected from the group consisting of:
instructions for dragging and dropping an element in the displayed graphical model;
instructions for resizing an element in the displayed graphical model;
instructions for displaying a hierarchy of sub-elements for an element displayed graphical model;
instructions for displaying a hierarchy of super-elements for an element displayed graphical model;
instructions for panning across a view of the displayed graphical model;
instructions for zooming in or out of a view of the displayed graphical model;
instructions for rotating an element in the displayed graphical model;
instructions for connecting or disconnecting elements in the displayed graphical model;
instructions for protecting and partitioning an area of the displayed graphical model;
instructions for simultaneously selecting a plurality of elements in the displayed graphical model;
instructions for copying and pasting an element in the displayed graphical model;
instructions for modifying a parameter of an element in the displayed graphical model; and
instructions for granting a user access to the displayed graphical model.

16. The non-transitory computer-readable medium of claim 11, further comprising:
instructions for sensing a plurality of combinations of positions and motions of the user, wherein the displayed graphical model is adjusted based on the plurality of combinations.

17. The non-transitory computer-readable medium of claim 11, wherein the tactile input from the user is sensed by a FTIR system comprising the display.

18. A computer-implemented graphical modeling system comprising:
a display to display a graphical model on the display, the displayed graphical model having at least a first element having a first connection port and a second element having a second connection port;
an interface to:
receive tactile input from a user, the tactile input from the user manipulating the displayed graphical model by:
selecting the first connection port and the second connection port, and connecting or disconnecting the first displayed element and the second displayed element using the selected first connection port and the second connection port,
the interface comprising a substantially planar surface for receiving the tactile input from the user and for allowing the user to view the graphical model,
where the interface manipulates the displayed graphical model based on an interaction between the user and the display, where the interaction is one of:
a portion of the user interacting with the display, the portion and another portion of the user simultaneously interacting with the display, or a plurality of portions of the user simultaneously interacting with the display.

19. The system of claim 18, wherein the portion of the user is selected from the group consisting of:

one finger on one hand;

one finger on one hand and one finger on another hand;

a plurality of fingers on one hand;

one finger on one hand and a plurality of fingers on another hand; and a plurality of fingers on one hand and a plurality of fingers on another hand.

20. The system of claim 18, wherein a location of the tactile input from of the user is selected from the group consisting of:

within an element of the displayed graphical model;

outside of an element of the displayed graphical model;

within a menu displayed on the display;

within a portion of the display not including the displayed graphical model;

around the perimeter of an element of the displayed graphical model;

on the perimeter of an element of the displayed graphical model;

and on a connection port of an element of the displayed graphical model.

21. The system of claim 18, wherein the interface is further configured to:

sense a movement of the at least first portion of the user in relation to the displayed graphical model to obtain a sensed movement, wherein the movement of the user is selected from the group consisting of:

a motion of a finger;

motions of a plurality of fingers;

a series of motions of a finger; and a series of motions of a plurality of fingers.

22. The system of claim 18, wherein adjusting the displayed graphical model is selected from the group consisting of dragging and dropping an element in the displayed graphical model;

resizing an element in the displayed graphical model;

displaying a hierarchy of sub-elements for an element displayed graphical model;

displaying a hierarchy of super-elements for an element displayed graphical model;

panning across a view of the displayed graphical model;

zooming in or out of a view of the displayed graphical model;

rotating an element in the displayed graphical model;

connecting or disconnecting elements in the displayed graphical model;

protecting and partitioning an area of the displayed graphical model;

copying and pasting an element in the displayed graphical model;

modifying a parameter of an element in the displayed graphical model; and granting a user access to the displayed graphical model.

23. The system of claim 18, wherein the interface is an frustrated total internal reflection system (FTIR) comprising the display.

24. A computer-implemented graphical modeling system comprising:

a display for displaying a graphical model;

an interface coupled to the display for receiving tactile input from a user for manipulating the displayed graphical model based on an interaction between the user and the display, wherein the interaction includes:

identifying a specific function to be assigned to a unique motion, recording the unique motion, and assigning the unique motion to the specific function, the unique motion having been previously unassigned to the specific function, and modifying a parameter of an element in the displayed graphical model due to the tactile input from the user, where the interaction is a first part of the user continuously interacting with the display at a first location and a second part of the user continuously interacting with the display at a second location, a third location and an area between the second location and the third location.

* * * * *

UNITED STATES PATENT AND TRADEMARK OFFICE
CERTIFICATE OF CORRECTION

| | | |
|---|---|---|
| PATENT NO. | : 8,525,813 B1 | Page 1 of 1 |
| APPLICATION NO. | : 11/889270 | |
| DATED | : September 3, 2013 | |
| INVENTOR(S) | : Smith et al. | |

It is certified that error appears in the above-identified patent and that said Letters Patent is hereby corrected as shown below:

In the Claims:

Claim 3, column 16, line 10, replace "model;" with --model; and--.

Claim 5, column 16, line 22, replace "claim 1" with --claim 4--.

Signed and Sealed this
Twenty-first Day of October, 2014

Michelle K. Lee
*Deputy Director of the United States Patent and Trademark Office*

UNITED STATES PATENT AND TRADEMARK OFFICE
CERTIFICATE OF CORRECTION

PATENT NO.       : 8,525,813 B1                                       Page 1 of 1
APPLICATION NO.  : 11/889270
DATED            : September 3, 2013
INVENTOR(S)      : Smith et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1140 days.

Signed and Sealed this
Twenty-third Day of May, 2017

Michelle K. Lee
*Director of the United States Patent and Trademark Office*